June 8, 1926.

F. W. GROBY

ACCOUNTING SHEET

Filed Feb. 28, 1919

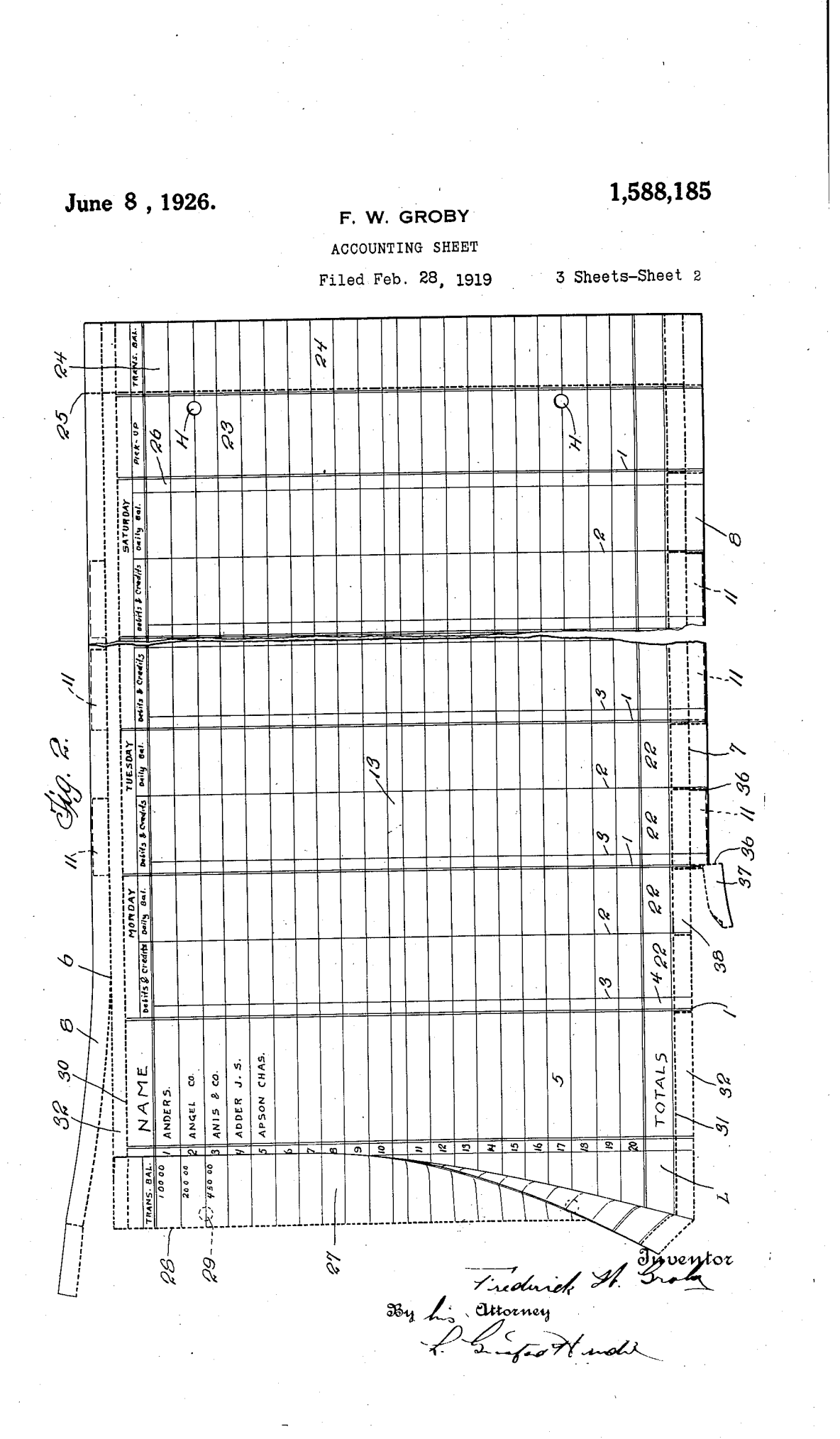

June 8, 1926.  
F. W. GROBY  
1,588,185  
ACCOUNTING SHEET  
Filed Feb. 28, 1919  3 Sheets-Sheet 2

June 8, 1926.

F. W. GROBY

ACCOUNTING SHEET

Filed Feb. 28, 1919

Inventor
Frederick W. Groby
By his Attorney

Patented June 8, 1926.

1,588,185

UNITED STATES PATENT OFFICE.

FREDERICK W. GROBY, OF RIVER EDGE, NEW JERSEY, ASSIGNOR TO UNDERWOOD TYPEWRITER COMPANY, A CORPORATION OF DELAWARE.

ACCOUNTING SHEET.

Application filed February 28, 1919. Serial No. 279,679.

This invention relates to an accounting device, and particularly to what is familiarly known to accountants as a safe guard ledger sheet, the present invention being an improvement over what is shown and described in my pending application Serial No. 264,169, filed November 26, 1918.

The object of the present invention is to provide an accounting sheet embodying further improvements and conveniences beyond those shown in said pending application, adapted particularly to enable all of the calculations, etc., which are to appear upon the sheet to be performed by a mechanical typewriting and calculating machine.

A further object is to provide means whereby the detachable pick-up strips employed are adapted to be attached to either, or both, sides of the ledger sheet, thereby reducing the required number of pick-up strips by half.

A further object is to provide improved means whereby the pick-up strips may be detached from the sheet.

A further object is to provide means whereby the sheet itself is reversible so that its opposite sides may be readily used with equal facility and to provide means whereby the balances as shown at the right hand margin, regardless of which side is being used, may be detached or otherwise used for transfer of said balances to another sheet, or to the opposite side of the same sheet.

A further object is to provide means whereby certain defaced portions of the sheet, resulting from the attaching and detaching of the pick-up strips, may be removed, in whole or in part, to the end that the sheet, as finally completed and ready for attachment into a loose binder, may be clean and undefaced.

A further object is to provide portions of the sheet adjacent the several columns so that said portions are detachable, either individually or collectively, to the end that said portions may be removed for convenience in transferring to another book, or department, totals which may be impressed upon said portions of the sheet with regard to the respective columns.

A further object is to provide means whereby more than one pick-up strip may be employed for each day, if desired.

Other objects and aims of the invention, more or less specific than those referred to above, will be in part obvious and in part pointed out in the course of the following description of the elements, combinations, arrangements of parts and applications of principles, constituting the invention; and the scope of protection contemplated will be indicated in the appended claims.

In the accompanying drawings which are to be taken as a part of this specification, and in which I have shown merely a preferred form of embodiment of the invention:

Figure 1 is a plan view of a sheet having its features arranged in accordance with this invention.

Figure 2 is a view similar to that shown in Fig. 1 but showing the reverse side of the sheet to illustrate the manner of transferring the balances from one side to the other.

Figure 3 is a view similar to that shown in Fig. 1, but having all of the detachable parts removed to illustrate the condition of the finished sheet preparatory to placing it in a permanent binder, and Figure 4 is a view illustrating the use of the double pick-up strips.

For the purpose of illustration, the sheet shown in the present drawings, and herein described, like that shown and described in said pending application, is such as would be used in a bank, or the like, for calculating the various depositors' balances from day to day and week to week. As before however, it will be apparent that the principles of this invention may be as readily applied to any other use according to desire or requirement, and that the only essential difference would be the difference in the captions used, or in the substitution of named commodities, etc., instead of company and personal names, as herein given.

Referring to the drawings for describing in detail the structure which is illustrated therein, the reference character L indicates a sheet of paper, or the like, upon which is ruled a series of horizontal lines spaced apart to define a plurality of numbered spaces, as indicated, 1, 2, 3, 4, etc. Of course the length of the sheet may be such as to include any desired number of these spaces.

A series of relatively conspicuous vertical lines 1, is provided to divide the sheet horizontally into sections one for each day of the week, several sections being captioned "Monday", "Tuesday", etc.

Each of these sections is divided by a vertical line 2 providing two columns, one captioned "Debits & credits" and the other captioned "Daily balance".

Other vertical lines 3 may be provided, if desired, providing a small column 4 in which brief notation may be made referring to the items adjacent thereto.

Adjacent the left hand margin of the sheet is provided a name column 5 into which the names, as "Anders" "Angel Co.", "Anis & Co.", etc., may be printed, said names being placed in the spaces defined by the horizontal lines.

For certain of the sections detachable "pick-up" strips, as G, are provided. These strips may be separately formed, or otherwise, as found most expedient, but it is an object of the present invention to provide improved means for attaching and detaching these strips where the same are separately formed.

In order to carry out this object, the sheet L is provided with a horizontal line of perforations 6 adjacent its upper edge, and a similar line of perforations 7, adjacent its lower edge. These lines of perforations provide two strips, as 8, which may be readily severed from the body of the sheet. The "pick-up" strips G are suitably gummed, as at 9, at their upper and lower ends so that the "pick-up" strips may be readily attached to the strips 8, without being attached to any other portion of the sheet L so that when it is desired to remove the "pick-up" strips, it is simply necessary to detach all, or a portion of the strips 8, and the "pick-up" strips will follow of course. The "pick-up" strips are preferably provided with lines of perforations, as 10, which correspond with the perforations 6 and 7 so that the major portion of the "pick-up" strips may be readily severed from the strips 8 particularly for subsequent use at the opposite side of the sheet L, as will be presently referred to.

If desired, the "pick-up" strips G may be severed along the lines 10 without detaching any portion of the strips 8, at least until all of the "pick-up" strips have been used and removed, whereupon the strips 8 may be torn off so as to thereby remove from the sheet L, the stubs 11 of the "pick-up" strips which remain gummed to the strips 8. In fact, it has been found expedient to follow this course of procedure with regard at least to some of the "pick-up" strips, particularly those of the early days of the week, thus leaving the upper and lower edges of the sheet intact.

It has been found desirable to provide the "pick-up" strips with a small gummed surface, as 12, substantially midway in the length of the strips, whereby to attach the mid portions of the strips temporarily to the surface of the sheets L. For this purpose a specially allotted space, as 13, is provided horizontally through the middle of the sheet, which space is unnumbered and is adapted only to receive the gummed portions 12. In removing the "pick-up" strips from the spaces 13, the strips will peel off without leaving any objectionable evidence of their presence.

Each of the "pick-up" strips is provided with horizontal lines 14 arranged as continuations of the lines defining the name spaces 1, 2, 3, etc.

As illustrated, the first "pick-up" strip in Fig. 1 is shown to overlie the "Debits & credits" column of the section "Tuesday".

In use, the sheet is placed in a typewriting, or calculating machine, in the usual manner, the names of the depositors, if not previously printed, are written into the column 5 and the balances from the previous day are written into the column "Daily balance" of the "Monday" section.

In the name space numbered 1, in the drawing, the depositor's name is "Anders", and the balance to his credit, brought over from the previous Saturday night, as shown on the drawing in the "Daily balance" column of the "Monday" section, is $100.00.

This is written for all the depositors and the sheet is usually then removed from the machine so that similar data may be impressed upon other sheets.

Subsequently, withdrawals are noted and balances struck:

In the space numbered 1 in the drawing, Fig. 1, the amount withdrawn by Mr. Anders, as shown by the shaded figures in the "Debits & credits" column of the "Monday" section, is $50.00. In order that the typewriting machine may be made to compute the difference between Mr. Anders' previous balance of $100, and the present withdrawal of $50, the amount of the balance must necessarily be first written somewhere by the machine in order to enable the mechanical calculating devices of the machine to properly register the amount. This writing of the balance is compulsory, and yet the space upon which the writing is done is wasted. Hence, the value of the removable strips G to receive this writing. This writing of the balance is familiarly known as "picking-up" the balance and from this fact the strips G are properly termed "pick-up" strips.

Therefore, the amount of the balance, $100, is written upon the "pick-up" strip, as at 15. The carriage of the machine is then shifted, and the amount of the withdrawal, $50, is written, preferably in red, in the "Debits & credits" column, as at 16. The printing of the amount of the withdrawal automatically registers in the indicator of the machine, and the indicator will visually show the difference between the original balance, $100, and the amount of the withdrawal, which difference, in this instance, is $50, this being a new balance for Mr. Anders. The operator thereupon shifts the carriage and writes into the "Daily balance" column, as at 17, the amount $50.00. As proof that the amount written by the operator as the difference between the original balance and the withdrawal, exactly corresponds to the amount shown on the indicator of the machine, the operator may impress a "proof star", as 18, upon the "pick-up" strip, it being understood that the machine may comprise suitable mechanism to prevent the impression of the "proof star" unless the amount which the operator has written at 17 corresponds exactly to the amount of the difference between the original balance and the withdrawal, as shown visually on the indicator of the machine.

Subsequently, as shown in the drawing, the depositor Anders makes a deposit of $400.00.

The operator, at the close of business for Monday, desiring to compute Anders' balance to be carried over to Tuesday, picks-up on to the machine the amount of the former balance, $50, by writing said amount upon the "pick-up" strip, as at 19. The operator then shifts the carriage of the machine and writes the amount $400, in the "Debits & credits" column of the "Monday" section, preferably in black so as to distinguish it from a withdrawal. This automatically registers the amount of the deposit on the machine, and the indicator of the machine visually shows the sum of $50, plus $400, or $450, which the operator thereupon writes into the "Daily balance" column of the section "Tuesday", at 20, impressing the "proof-star", as at 21, upon the "pick-up" strip of the section "Tuesday" to show that the writing is in exact accordance with the showing upon the indicator of the machine.

This same process is proceeded with relative to each of the depositors in the columns 5, and for each day of the week, according to the number of depositors and the various deposits and withdrawals made by each on the respective days.

It will be apparent that the "pick-up" strips G have been used simply as a convenient medium upon which to impress the figures necessary to cause the indicator of the machine to properly register the different amounts upon which the calculations are based and upon which to impress the "proof-stars" which, like the other matter written upon the "pick-up" strips, are usually of no subsequent use.

At the conclusion of business for Monday, and after the balances have been carried over to the "Daily balance" column of "Tuesday", the "pick-up" strip overlying the "Debits & credits" column of "Tuesday", and which has been used for Monday's calculations, may be detached and removed so as to leave the "Debits & credits" column of the "Tuesday" section clear, or blank, so that said column may be utilized to receive deposits and withdrawals in the manner already referred to for the "Debits & credits" column of the section "Monday". If on Tuesday the depositor Anders makes a withdrawal then the amount $450, will be picked up on the "pick-up" strip of the section "Wednesday". The amount of the withdrawal will be written into the "Debits & credits" column of the section "Tuesday", and the difference, or new balance, as shown on the indicator of the machine, will be written into the "Daily balance" column of the section "Tuesday" just beneath the amount $450.00.

This process is continued for each day of the week, and for each depositor, and it will be apparent that the "Daily balance" columns will not only show at a glance the balances on hand of each depositor from day to day, but will also show the changes in the amount of balance during the respective days.

The totals for the various columns may be written in the spaces, as 22, beneath the columns, and the "pick-up" operations, incident to any addition or subtraction calculations which it may be desired to make with respect to said totals, may be made upon the "pick-up" strips.

By thus providing removable surface portions upon which the "pick-up" operations can be performed, the width of the sheet L is maintained at a minimum, and the completed sheet bears no waste figures.

For the last section at the right of the sheet, as for instance the section "Saturday" shown in the drawings, the "pick-up" operation may conveniently be performed directly upon the sheet, as in the column 23, and the "Daily balance" intended to be carried over to the next sheet, is preferably written in a special column 24, captioned "Transfer balance," which is provided upon a portion of the sheet at the extreme right hand edge adapted to be separated from the main portion of the sheet along a perforated line 25. When the sheet is completed, the portion bearing the column 23 is detached and is placed temporarily upon the sheet for the subsequent week in a position to the left of the "Daily balance" column of the "Monday" section of said subsequent week. The operator is thereby enabled to quickly and correctly transfer the balance shown in the column 24 to the "Daily balance" column of the section "Monday" of said subsequent week.

It should be noted that the provision of the "pick-up" column 23 directly upon the sheet L does not unnecessarily increase the width of the sheet since this space is required to carry the binding perforations or the like, as H, by means of which the sheet may be bound into a suitable binder.

A narrow column, as 26, is provided adjacent the column 23 upon which to impress the "proof-stars" with respect to the section "Saturday".

It should be mentioned that although the "pick-up" strips G of Fig. 1, are shown to be positioned over the "Debits & credits" column of the several days, nevertheless they could, of course, be otherwise positioned according to convenience. For instance, the "pick-up" strip for "Tuesday" section might be placed over the finished "Daily balance" column of the section "Monday" instead of being placed over the blank "Debits & credits" column of the section "Wednesday".

Also, more than one "pick-up" strip might be used for each day in cases where sufficient space cannot be found upon a single strip, or, as shown in Fig. 4 of the drawings, where it is desired to perform a double pick-up operation with a view to more definitely assuring accuracy on the part of the operator.

While the strips G are primarily intended as "pick-up" strips, it will, of course, be obvious that they may be used for other purposes, as for instance, as a sort of scrap space upon which any necessary calculations may be performed.

It should also be mentioned that while the drawing illustrates the "Debits & credits" to be located in a single column, being distinguished only by different colored type, nevertheless two separate columns may, of course, be provided if desired.

As has been above suggested, it is intended that the sheet shown herein shall be reversible so that both its surfaces may be used with equal facility, also that the same "pick-up" strips which have been used upon one surface, may, if desired, be subsequently used upon the opposite surface.

In order to render the sheet reversible, the same is preferably provided with a strip 27 at its left hand margin corresponding in size with the strip 24, and being connected to the main portion of the sheet as by a line of perforations 28. Also, a second set of binder perforations 29 may be provided so that the sheet may be placed in a binder with either of its surfaces uppermost, as preferred.

The provision of the strips 27 serves a further and very important purpose since in practice after one surface of the sheet has been used, for instance, the surface opposite to the surface shown in Fig. 1, said strip 27 which then, of course, bears upon its reverse side balances appearing for the several depositors at the end of the finished week, may be readily folded over upon that surface of the sheet which is shown in Fig. 1, so that the balances appearing in the "Transfer balance" column of said strip 27 will appear opposite the same depositors' names as is graphically illustrated in Fig. 2 of the drawings. The figures appearing in the "Transfer balance" column of the strip 27 may then be readily copied, without likelihood of error, in the "Daily balance" column of the section "Monday" for the new week.

In order to better understand this feature of the invention, let it be assumed that the reverse side of the sheet shown in Figs. 1 and 2 of the drawings has been completed and the balances appearing at the end of last week for the depositors Anders, Angel Co., and Anis & Co., and printed into the "Transfer balance" beyond the "Saturday" section of last week, that is, on the reverse side of the strip 27, Fig. 1, were respectively $100, $200 and $450. Now, by turning the strip to present the surface shown in Figs. 1 and 2, and by folding the strip 27 in Fig. 1, over as shown in Fig. 2, these balances appear in their proper positions relative to the depositors' names, ready for transfer into the "Daily balance" column of the "Monday" section of the present week, etc., as above described with respect to the calculations appearing in Fig. 1.

After serving its purpose, as indicated, the strip 27 may be removed and discarded if desired.

At the end of the present week, the strip 24 may be removed with its balances printed thereon, and said balances transferred to a subsequent sheet as has been already described.

It should also be pointed out, with respect to the strips 24 and 27, that the lines of perforations 25 and 28 constitute clearly defined and very satisfactory hinge means by which said strips 24 and 27 may be conveniently folded over upon either surface of the main portion of the sheet so as thus to materially reduce the width of the sheet and to thereby enable the insertion of the sheet into the calculating machine all of which, now available, are adapted to receive the sheets of limited width only.

The illustration Fig. 2 shows the strips 8 in the process of being removed, as has been above suggested for removing the stubs 11 of the "pick-up" strips which have been used at the opposite surface of the sheet.

In order to remove the stubs of the "pick-up" strips which are to be used at the new surface of the sheet, the sheet is preferably formed with a second line of perforations, as 30, extending horizontally along its upper edge, and a corresponding line of perforations 31 extending horizontally along its lower edge, said lines being spaced somewhat inside of the lines 6 and 7 so as to define detachable strips 32 one at the top, and one at the bottom of the sheet to which the opposite ends of the "pick-up" strips may be attached. The "pick-up" strips are provided with second lines of perforation 33 and 34 to correspond with the perforations 30 and 31 whereby the "pick-up" strips may be severed from their new stubs after having been used. These new stubs, like those above described, may be totally removed from the sheet by the detachment of the strips 32.

In order that the "pick-up" strips may be conveniently used upon the two surfaces of the sheet, the two surfaces of the "pick-up" strips are preferably printed alike and the gummed surfaces 35, by which to attach the strips for second use, are formed upon the opposite side of the strip from the gummed surfaces 9 and in the spaces between the lines of perforations 10 and 33, and 10 and 34, instead of between the lines of perforations 10 and the ends of the strips as are the gummed surfaces 9.

In this way the portions of the strips carrying the gummed surfaces 9 are adapted to remain attached to the strips 8 when the main portions of the "pick-up" strips, together with the portions carrying the gummed surface 35 are removed, while the portions carrying the gummed surfaces 35 are adapted for attachment to the strips 32 by reversing the "pick-up" strips.

It will be apparent that by this provision the amount of material required for the "pick-up" strips is diminished by exactly half of what would be required were said strips not reversible.

As above suggested, it is further contemplated that this invention shall include means whereby the totals for the various columns may be readily transferred. This feature includes the provision of short vertical lines of perforations, as 36, one for each of the "Debits & credits" and "Daily balance" columns, said lines dividing the strips 8 and 32 at the bottom of the sheet into a plurality of small sections, as 37 and 38, which may be individually detached, if desired.

In making use of this feature, the operator may conveniently impress the totals of the columns upon said pieces 37 and 38, either in addition to impressing them in the spaces 22, or in lieu of impressing them in the spaces 22.

Thus the pieces 37 and 38 may be detached, for instance, at regular periods, and turned over to a different department, or accountant, without depriving the holder of the main sheet of the use of said sheet for any period.

It will be noted that if desired the pieces 37, which are beyond the pieces 38, may be used for receiving the totals with respect to the first used surface of the sheet leaving the pieces 38 to be used for receiving the totals of the second used surface of the sheet.

The smaller gummed surfaces 12, midway in the length of the "pick-up" strips, as above mentioned, may be duplicated upon the two surfaces of the strips as seen in Fig. 1.

It should be mentioned further that the surfaces of the strips 8 and 32 may be used for scratch, or pick-up operations, if desired.

From the above description, it will be apparent that after the two surfaces of the sheet have been completed, all of the detachable features thereof are, or may be removed, as shown in Fig. 3, so as to leave a sheet which is unencumbered, which is of unbroken marginal outline, and above all, one which is of a desirably reduced size, as will be readily seen by a comparison of the sheets as shown in Figs. 3 and 4.

In the view, Fig. 4, a sheet is shown which is the same as that shown in Fig. 1, and in connection with this sheet there is shown two "pick-up" strips attached to the sheet. These two "pick-up" strips are relative to the single day Tuesday, and their purpose is to provide spaces in which the "pick-up" operation may be always performed so as thereby to doubly insure accuracy of the calculations.

As many changes could be made in this construction without departing from the scope of the invention as defined in the following claims, it is intended that all matter contained in the above description or shown in the accompanying drawings, shall be interpreted as illustrative only and not in a limiting sense.

Having thus described my invention, what I claim as new and desire to secure by Letters Patent is:—

1. A sheet of the class described having a "pick-up" strip attached thereto, said sheet having a removable portion to which the "pick-up" strip is connected and by the removal of which the "pick-up" strip may be disconnected.

2. A sheet of the class described having a "pick-up" strip attached thereto, said "pick-up" strip having detachable portions by which it may be detachably connected with the sheet.

3. A sheet of the class described having a "pick-up" strip attached thereto, said "pick-up" strip being reversible and having a plurality of separate portions, one adapted for attaching the "pick-up" strip with one of its surfaces exposed, and the other for attaching the "pick-up" strip with its opposite surface exposed.

4. A sheet of the class described having a "pick-up" strip attached thereto, said "pick-up" strip being reversible and having a plurality of detachable portions one adapted for detachably attaching the "pick-up" strip with one of the its surfaces exposed, and the other for detachably attaching the "pick-up" strip with its opposite surface exposed.

5. A sheet of the class described having a "pick-up" strip attached thereto, said sheet having a plurality of removable portions, certain of which are adapted to have the "pick-up" strip attached thereto at one time and others of which are adapted to have the "pick-up" strip attached thereto at a different time, whereby the "pick-up" strip as first attached may be removed by the removal of the first mentioned removable parts and whereby the "pick-up" strip again attached may be removed by removal of the second mentioned removable parts.

6. A sheet of the class described having a "pick-up" strip attached thereto, said sheet having marginal portions connected thereto by lines of perforations, said marginal portions serving to receive the "pick-up" strip and being detachable along said lines of perforations for the removal of said "pick-up" strip.

7. A sheet of the class described having a "pick-up" strip attached thereto, said sheet having marginal portions connected thereto by lines of perforations, said marginal portions serving to receive the "pick-up" strip and being detachable along said lines of perforations for the removal of said "pick-up" strip, and at least one of said marginal portions having transverse lines of perforations provided therein whereby it may be removed in sections.

8. A sheet of the class described having "pick-up" strips attached thereto, said "pick-up" strips having gummed surfaces at their opposite ends by which said opposite ends are attached to the sheet, and said strips having a gummed surface intermediate its ends by which the intermediate portion of the strip is attached to the sheet.

9. A sheet of the class described having "pick-up" strips attached thereto, said "pick-up" strips having gummed surfaces upon their opposite surfaces at their two ends so that the strips may be attached to the sheet with either of its faces exposed, and said strips also having gummed surfaces provided at their opposite surfaces intermediate the ends of the strips whereby the intermediate portions of the strips may be attached to the sheet.

In testimony whereof I affix my signature.

FREDERICK W. GROBY.